US007916326B2

(12) United States Patent
Edwards et al.

(10) Patent No.: US 7,916,326 B2
(45) Date of Patent: *Mar. 29, 2011

(54) SYSTEM AND METHOD FOR EFFICIENT TRANSFER OF IMAGE DATA TO A SERVICE PROVIDER

(75) Inventors: Eric D. Edwards, San Francisco, CA (US); Neal J. Manowitz, Woodcliff Lake, NJ (US); Steven G. Goldstein, Los Angeles, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 32 days.

This patent is subject to a terminal disclaimer.

(21) Appl. No.: 11/196,863

(22) Filed: Aug. 4, 2005

(65) Prior Publication Data

US 2005/0264845 A1    Dec. 1, 2005

Related U.S. Application Data

(63) Continuation of application No. 09/552,815, filed on Apr. 20, 2000, now Pat. No. 6,943,909.

(51) Int. Cl.
*G06F 3/00* (2006.01)

(52) U.S. Cl. ............ 358/1.15; 358/1.12; 358/1.13; 358/1.14; 358/296; 358/909.1; 358/527; 358/1.1; 348/231; 348/232; 348/233; 348/207; 348/33

(58) Field of Classification Search ........... 358/1.15, 358/527, 1.12, 1.13, 1.14, 296, 909.1, 1.1; 709/203; 348/207.1, 207.2, 211.2, 211.3, 348/231.2, 231.3, 231.4, 231.5, 231.6, 231, 232, 233, 207, 33, 211, 333; 399/79

See application file for complete search history.

(56) References Cited

U.S. PATENT DOCUMENTS

| 5,666,159 | A  | * | 9/1997  | Parulski et al. | ............ 348/211.2 |
| 5,974,401 | A  | * | 10/1999 | Enomoto et al.  | ................ 705/40 |
| 6,516,416 | B2 | * | 2/2003  | Gregg et al.    | ....................... 726/8 |
| 6,573,927 | B2 | * | 6/2003  | Parulski et al. | ................ 348/32 |
| 6,747,692 | B2 | * | 6/2004  | Patel et al.    | ................ 348/211.2 |

(Continued)

OTHER PUBLICATIONS

Color Zaurus, "The Zaurus Enables You To Access the Internet With Extreme Ease" and "Multimedia Internet Mail", by Kazuaki Ide, Sharp Corp., published by Softbank Corp. in Japan on Aug. 15, 1996.

*Primary Examiner* — King Y Poon
*Assistant Examiner* — Pawandeep S Dhingra
(74) *Attorney, Agent, or Firm* — Gregory J. Koerner; Redwood Patent Law

(57) ABSTRACT

A system and method for efficient transfer of image data to a service provider comprises a digital image source, an image pump, and a communication path to the service provider. The digital image source may be connected to the image pump using any appropriate communication configuration. Digital image data from the digital image source is transferred to the image pump, which may format the digital image data to conform to requirements of the particular service provider. The image pump may also attach customer account information and user service selections to the digital image data. The image pump may then send the digital image data and any attached information to the service provider. The service provider responsively may perform the requested services and return a finished product to the user.

19 Claims, 9 Drawing Sheets

U.S. PATENT DOCUMENTS

| | | | |
|---|---|---|---|
| 6,784,924 B2 * | 8/2004 | Ward et al. | 348/207.1 |
| 6,930,709 B1 * | 8/2005 | Creamer et al. | 348/211.3 |
| 6,972,859 B1 * | 12/2005 | Patton et al. | 358/1.15 |
| 7,051,003 B1 * | 5/2006 | Kobata et al. | 705/51 |
| 7,158,945 B1 * | 1/2007 | Wolcott et al. | 705/26 |
| 2002/0059231 A1 * | 5/2002 | Kuwano et al. | 707/7 |

* cited by examiner

SYSTEM AND METHOD FOR EFFICIENT TRANSFER OF IMAGE DATA TO A SERVICE PROVIDER

CROSS-REFERENCE TO RELATED APPLICATIONS

This application is a continuation of, and claims priority in, U.S. patent application Ser. No. 09/552,815 entitled "System And Method For Efficient . Transfer Of Image Data To A Service Provider" that was filed on Apr. 20, 2000, now issued U.S. Pat. No. 6,943,909. The foregoing related Patent is commonly assigned, and is hereby incorporated by reference.

BACKGROUND SECTION

1. Field of the Invention

This invention relates generally to digital imaging systems, and relates more particularly to a system and method for efficient transfer of image data to a service provider.

2. Description of the Background Art

Implementing an effective and efficient method for transferring image data to a service provider is a significant consideration of designers and manufacturers of digital imaging systems. Captured images from some digital cameras are now able to produce photographic prints that are comparable in quality to prints produced from traditional film cameras. However, unlike traditional film processing, there is currently insufficient infrastructure for simple and low-cost processing of digital image data. Digital image data is not necessarily embodied in a permanent physical medium, as opposed to a roll of film that must be physically transported to a service provider for developing and generating photographic prints. An exposed roll of film typically may be deposited with a service provider by hand or by mail.

Digital image data, like any other type of digital data, may be easily copied from one storage medium to another, and may be transmitted over numerous types of communication channels. However, many people may not be technically sophisticated enough to utilize digital image data to produce photographic prints. Other people may not be willing to invest in expensive equipment and/or software for generating high quality photographic prints from digital image data.

Traditional film processing services are available in a wide variety of locations, from specialty photography retailers to supermarkets and discount stores. Currently there are no equivalents to these convenient points of access to service providers for the processing of digital image data. Some potential users of devices that capture digital images may be discouraged from taking advantage of the unique features of digital images because of the insufficient infrastructure for processing digital image data. Thus, implementing an effective and efficient system and method for transferring digital image data to a service provider remains a significant consideration of designers and manufacturers of digital imaging systems.

SUMMARY

In accordance with the present invention, a system and method are disclosed for transferring image data to a service provider. In one embodiment, the invention includes a digital image source, an image pump, and a communication path to the service provider who provides any requested services such as producing photographic prints. The digital image source may communicate with the image pump using any appropriate communication configuration, including wireless connections, hard-wired physical connections, and various forms of removable storage.

Digital image data from the digital image source is preferably transferred to the image pump. The digital image source may be any appropriate device, including a digital camera or camcorder. The digital image data may also include other types of information, such as audio data and/or text data. For example, the audio data and/or text data may be attached to images as captions or comments.

In one embodiment, the image pump may format the digital image data to conform to requirements of the service provider. The image pump may also attach customer account information to the digital image data. In one embodiment, the image pump displays the images to the user who may then select images for processing and/or special services such as enlargements. Any required processing instructions may be attached to the image data. In another embodiment, a one-button operation allows the user to simply and quickly transfer image data to the service provider.

The image pump then may send the digital image data and any attached information to the service provider. The image pump may be connected to the service provider using any appropriate communication configuration, including wireless connections, hard-wired physical connections, and any appropriate form of removable storage. The service provider then may perform the required services and return the finished product to the user. The present invention thus efficiently and effectively transfers image data to a service provider.

DETAILED DESCRIPTION

The present invention relates to an improvement in digital imaging systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

A system and method for efficient transfer of image data to a service provider includes a digital image source, a device that acts as an interface between the digital image source and the service provider, which is termed an image pump hereinafter, and a communication path to the service provider. The digital image source may be connected to the image pump using any appropriate communication configuration. Digital image data from the digital image source is transferred to the image pump, which may format the digital image data to conform to requirements of the particular service provider. The image pump may also attach customer account information and user service selections to the digital image data. In other embodiments, formatting of image data and attaching of customer account information may be performed by the digital image source. The image pump then may send the digital image data and any attached information to the service provider. The service provider responsively may perform the requested services and return a finished product to the user.

Figure 1:
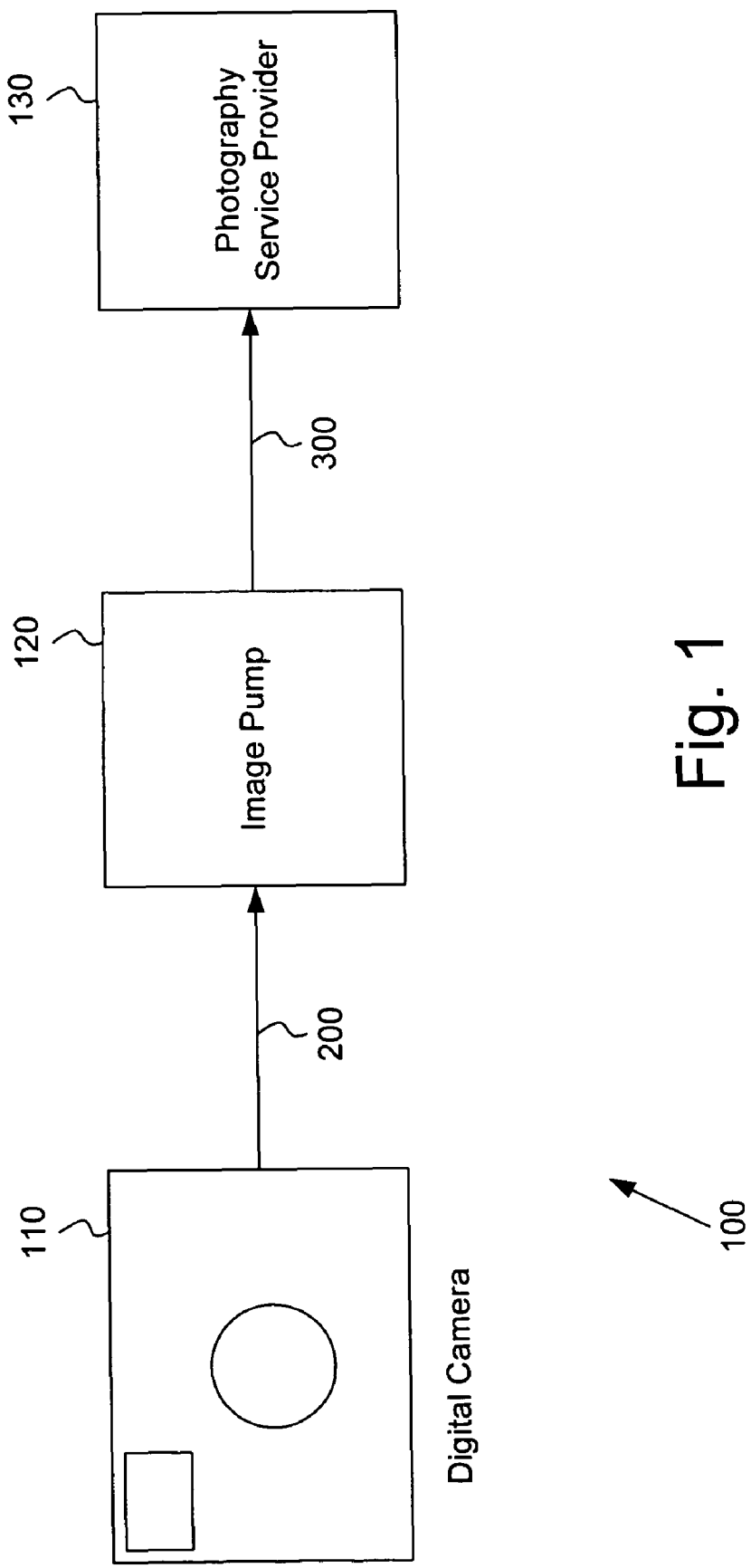
FIG. 1 is a block diagram for one embodiment of a system for efficient transfer of image data to a service provider, according to the present invention.

Referring now to FIG. 1, a block diagram for one embodiment of a system 100 for efficient transfer of image data to a service provider is shown, according to the present invention. In the FIG. 1 embodiment, system 100 includes, but is not limited to, a digital camera 110, an image pump 120, and a photography service provider 130. Although a digital camera 110 is shown in FIG. 1 and discussed throughout the detailed description, other sources of digital image data, for example camcorders, personal digital assistants (PDAs), and wireless telephones, are equally within the scope of the present invention.

Image data that may be sent to service provider 130 for processing is not limited to data that is captured by the user. For example, a user may download image data from the Internet using a PDA, and utilize image pump 120 to send the image data to service provider 130 for processing. In another embodiment of the present invention, an analog image source, for example an analog video camcorder, provides an image signal to image pump 120, which then digitizes the image signal to produce digital image data.

In accordance with the present invention, image pump 120 allows for simple and low-cost transfer of images from digital camera 110 to service provider 130. Digital image data from digital camera 110 may be transferred to image pump 120 via path 200. The digital image data may also include audio data and/or text data that may be attached to digital images as captions or comments. Image pump 120 may then forward the digital image data to service provider 130 via path 300. Service provider 130 then responsively performs any requested processing and returns the final product to a user of system 100. The implementation and functionality of image pump 120 are further discussed below in conjunction with FIGS. 6-8.

Figure 2:
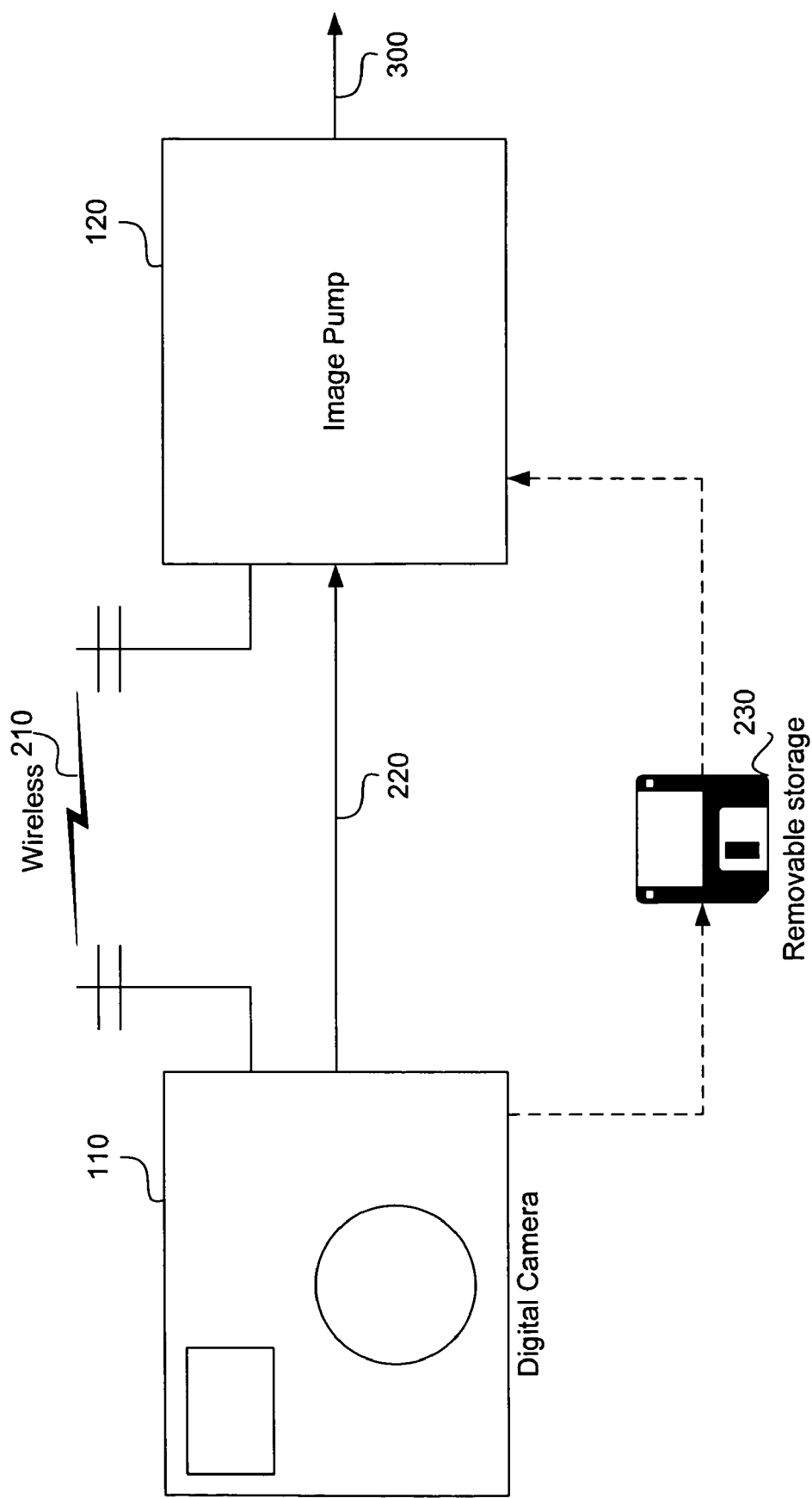
FIG. 2 is a diagram of an input section of the system of FIG. 1, according to embodiments of the present invention.

Referring now to FIG. 2, a diagram of an input section of the system of FIG. 1 is shown, according to embodiments of the present invention. In one embodiment, digital camera 110 is connected to image pump 120 via a wireless connection 210. Digital images may be transferred from digital camera 110 to image pump 120 via wireless connection 210. Wireless connection 210 may be implemented as any appropriate wireless communication configuration, including infrared or radio frequency technologies.

In an alternate embodiment, digital camera 110 is connected to image pump 120 via a hard-wired physical connection 220. Digital images may then be transferred from digital camera 110 to image pump 120 via hard-wired connection 220. Connection 220 may be implemented as any appropriate hard-wired connection for the transfer of digital data, including, but not limited to, IEEE-1394 or Universal Serial Bus (USB). In another embodiment, digital images captured by digital camera 110 are stored in a form of removable storage 230. Although a floppy disc is shown in FIG. 2, any appropriate form of removable storage may be used, including magnetic media (e.g., floppy discs), optical media (e.g., compact disc, DVD), magneto-optical media, and solid-state media. Digital images may be stored in removable storage 230, which may then be input to image pump 120. Image pump 120 may then retrieve the digital images from removable storage 230 for further handling or processing.

Figure 3:
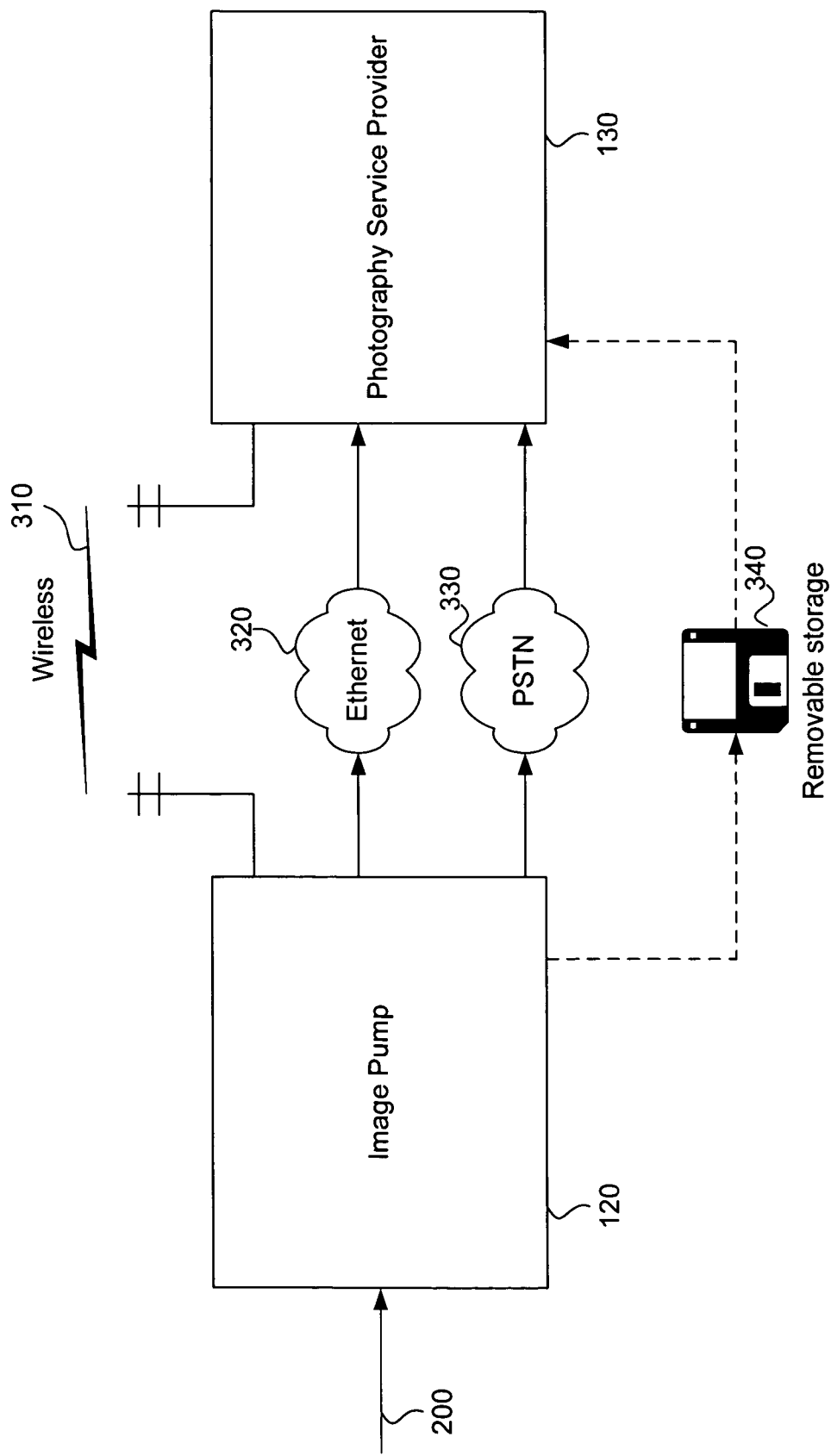
FIG. 3 is a diagram of an output section of the system of FIG. 1, according to embodiments of the present invention.

Referring now to FIG. 3, a diagram of an output section of the system of FIG. 1 is shown, according to embodiments of the present invention. In one embodiment, image pump 120 is connected to service provider 130 via a wireless connection 310. Digital images and other data may be transferred from image pump 120 to service provider 130 via wireless connection 310. Wireless connection 310 may be implemented as any appropriate wireless communication configuration, including infrared or radio frequency technologies.

In another embodiment, image pump 120 is connected to service provider 130 via an Ethernet connection 320. Image pump 120 may alternately be connected to service provider 130 via a modem (not shown) and a Public Switched Telephone Network (PSTN) connection 330. Although only two embodiments of hard-wired connections are shown, other appropriate embodiments of hard-wired connections are within the scope of the present invention. Digital images and other data may then be transferred from image pump 120 to service provider 130 via Ethernet connection 320 or PSTN connection 330 for processing.

In a further embodiment, image pump 120 may store digital images and other data on a form of removable storage 340. Although a floppy disc is shown in FIG. 3, other forms of removable storage, such as compact discs and memory cards, are within the scope of the present invention. Removable storage 340 may be physically transported to the photography service provider 130, which may then retrieve the images and other data from removable storage 340 for processing.

Figure 4:
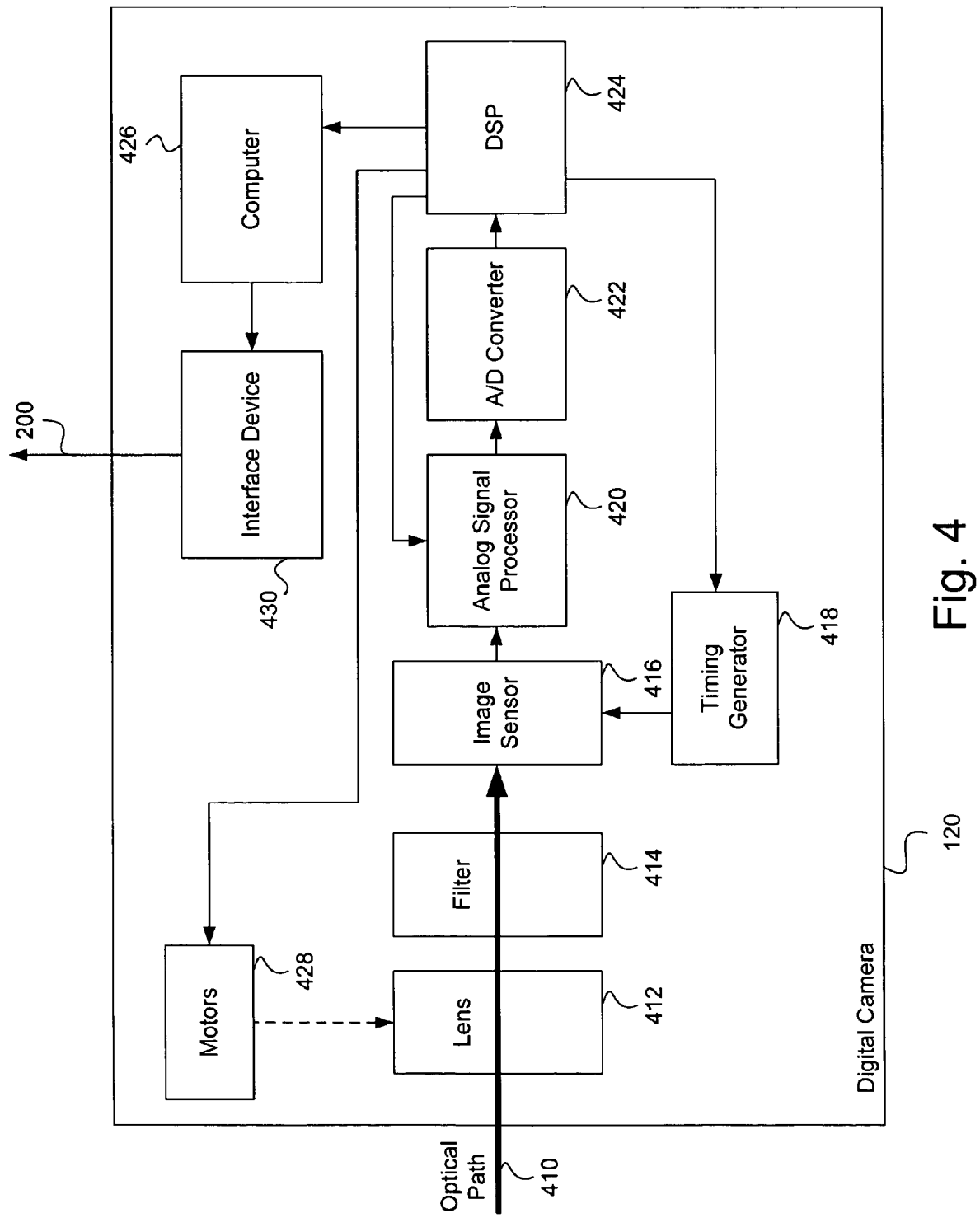
FIG. 4 is a block diagram for one embodiment of the digital camera of FIG. 1, according to the present invention.

Referring now to FIG. 4, a block diagram for one embodiment of digital camera 110 of FIG. 1 is shown, according to the present invention. Digital camera 110 includes, but is not limited to, a lens 412, a filter 414, an image sensor 416, a timing generator 418, an analog signal processor 420, an analog-to-digital (A/D) converter 422, a digital signal processor (DSP) 424, one or more motors 428, a computer 426, and an interface device 430. Computer 426 typically includes a processor and a memory.

Image sensor 416 captures an image via light passing through lens 412 and filter 414, and impacting image sensor 416 along optical path 410. Image sensor 416 responsively generates a raw image signal that represents the captured image. The raw image signal is output to analog signal processor 420, A/D converter 422, and DSP 424. DSP 424 outputs control signals to analog signal processor 420, timing generator 418, and motor 428. From DSP 424, the image data passes to computer 426 for storage and possibly further processing, for example adjusting the image size or color.

Interface device 430 allows digital camera 400 to output image data from computer 426 to image pump 120 via path 200. Interface device 430 may be implemented to correspond to a particular embodiment of path 200. For instance, if path 200 is a USB hard-wired connection, then interface device 430 may format the image data to conform to a USB standard. In another embodiment, interface device 430 may be implemented as a removable storage drive, whereby digital images may be stored on a form of removable storage for transfer to image pump 120.

Figure 5A:
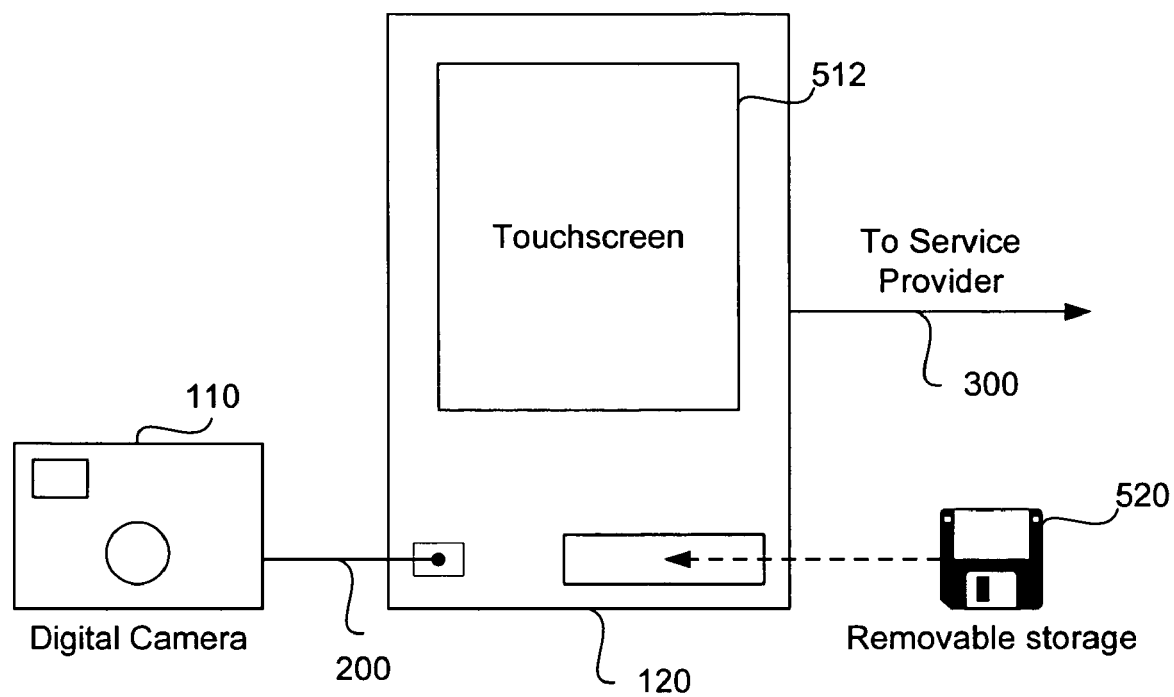
FIG. 5(a) is an elevation view for one embodiment of the image pump of FIG. 1, according to the present invention.

Referring now to FIG. 5(a), an elevation view for one embodiment of the image pump 120 of FIG. 1 is shown, according to the present invention. In FIG. 5(a), image pump 120 is embodied in a console with a touchscreen 512. A user may connect digital camera 110 to image pump 120. Although a hard-wired connection is shown in FIG. 5(a), any appropriate connectivity configuration is within the scope of the present invention.

Image pump 120 receives digital image data from digital camera 110, and may display each individual image on touchscreen 512. The user may then touch the displayed images on touchscreen 512 to select various images for various types of processing. For example, a user may desire multiple prints of one image and only one print of the others, or may desire large-sized prints of selected images. The user's selections are preferably included with the image data as an attachment before the images are forwarded to service provider 130 via path 300. Although a touchscreen is shown in FIG. 5(a), other types of input devices, such as a keyboard or a mouse, are within the scope of the present invention.

A user may also provide images to image pump 120 on a form of removable storage 520. Removable storage 520 may be inserted into image pump 120, and image pump 120 may then retrieve images stored on removable storage 520. Users may then select the services desired by indicating their choices to image pump 120 via touchscreen 512.

In another embodiment of the present invention, digital camera 110 is configured to allow the user to input processing selections. Thus, image pump 120 may receive image data, user selections, and/or other data from digital camera 110. Image pump 120 may present the user's selections on touchscreen 512 and prompt the user to modify or accept the current selections before sending the data to service provider 130.

Figure 5B:
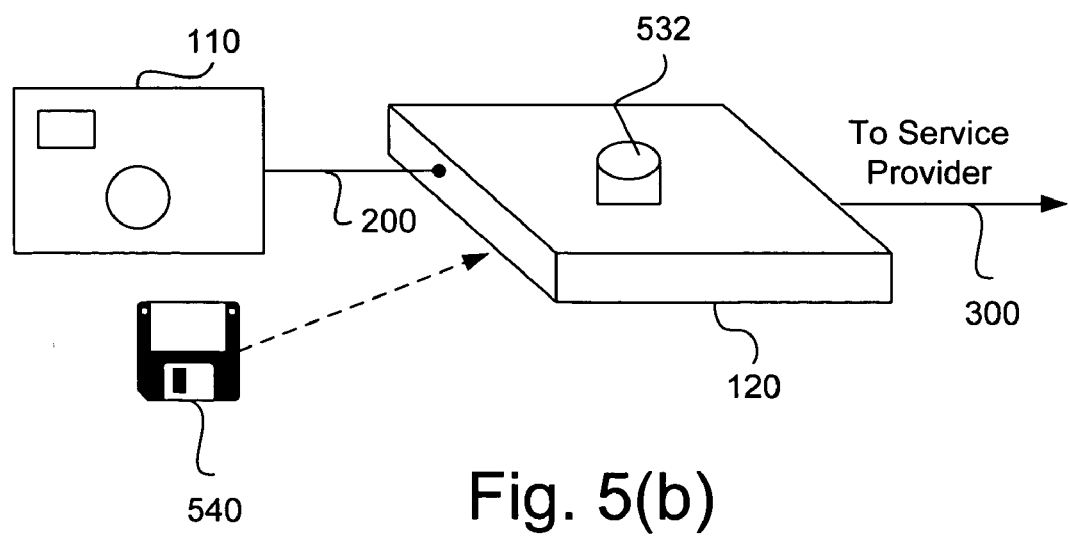
FIG. 5(b) is a perspective view for one embodiment of the image pump of FIG. 1, according to the present invention.

Referring now to FIG. 5(b), a perspective view for one embodiment of the image pump 120 of FIG. 1 is shown, according to the present invention. In FIG. 5(b), image pump 120 is embodied as a unit with a single button 532 for user operation of image pump 120. Although a button is shown in FIG. 5(b), any appropriate means for user operation, such as a switch, are within the scope of the present invention. In the FIG. 5(b) embodiment, a user may connect digital camera 110 to image pump 120. Although a hard-wired connection is shown in FIG. 5(b), any appropriate connectivity configuration is within the scope of the present invention. Similar to the FIG. 5(a) embodiment, a user may also provide digital image data to image pump 120 using a form of removable storage 540.

Once a user establishes a connection between digital camera 110 and image pump 120, a connection path 300 to service provider 130 may be established. The user may then depress button 532 to initiate a transfer of digital images from digital camera 110 to service provider 130. In the FIG. 5(b) embodiment, transfer of image data is simplified by a one-button operation that may be performed by a user. However, in this embodiment, low cost and simplicity of operation may limit service options selectable by the user.

Although only two physical embodiments of image pump 120 are shown in FIGS. 5(a) and 5(b), other embodiments are within the scope of the present invention. For example, image pump 120 may also be implemented in a general purpose computer, a voice-activated module, or in a digital camera device.

Figure 6:
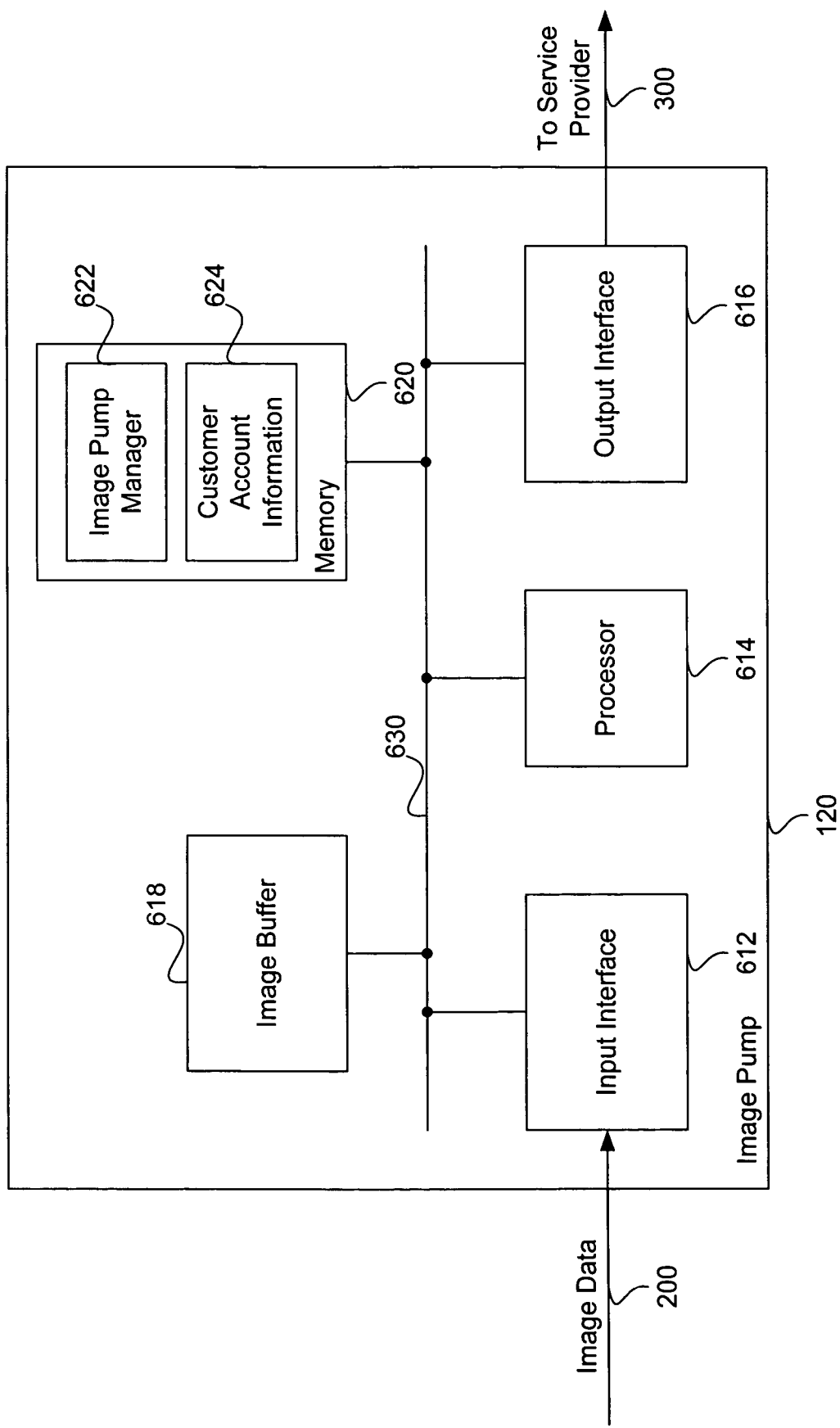
FIG. 6 is a block diagram for one embodiment of the image pump of FIG. 1, according to the present invention.

Referring now to FIG. 6, a block diagram for one embodiment of the image pump 120 of FIG. 1 is shown, according to the present invention. In the FIG. 6 embodiment, image pump 120 includes, but is not limited to, an input interface 612, a processor 614, an output interface 616, an image buffer 618, a memory 620, and a bus 630. Memory 620 preferably includes, but is not limited to, an image pump manager 622 and customer account information 624.

As described above in conjunction with FIGS. 1 and 2, image data may be transferred to image pump 120 via path 200. Input interface 612 preferably conforms to the configuration of the implemented embodiment of path 200. Path 200 may include more than one communication configuration, for example a hard-wired connection and a removable storage drive. Output interface 616 preferably conforms to the configuration of the implemented embodiment of path 300. Path 300 may also include more than one communication configuration.

Manipulation of digital images by image pump 120 may preferably be controlled by image pump manager 622 in conjunction with processor 614. Image pump manager 622 preferably retrieves digital images from digital camera 110 and stores them into image buffer 618. Image pump manager 622 may also display the images on a display device, for example touchscreen 512 (FIG. 5). Image pump manager 622 may also determine any user selections and/or instructions regarding specific services desired. Any user selections and/or instructions may be forwarded to service provider 130 with the images.

Image pump manager 622 may then send the images from image buffer 618 to service provider 130 via output interface 616 and path 300. Image pump manager 622 may also send other information to service provider 130, for example customer account information 624 and any user processing selections. Image pump manager 622 preferably formats the image data to conform to a format required by service provider 130.

In another embodiment, image pump manager 622 may be configured to retrieve images and other data from a form of removable storage (not shown) that is inserted into image pump 120. Data may be retrieved from the removable storage and stored in image buffer 618, then the removable storage may be removed from image pump 120. Image pump manager 622 then processes the image data as described above.

In another embodiment of image pump 120, image buffer 618 is not utilized. A form of removable storage containing digital images or other data may be inserted into image pump 120. Image pump manager 622 may then send the images from the removable storage to service provider 130 via output interface 616 and path 300. The removable storage remains in image pump 120 until the images are sent to service provider 130. Image pump manager 622 also preferably sends customer account information 624 and any user selections and instructions to service provider 130.

Figure 7:
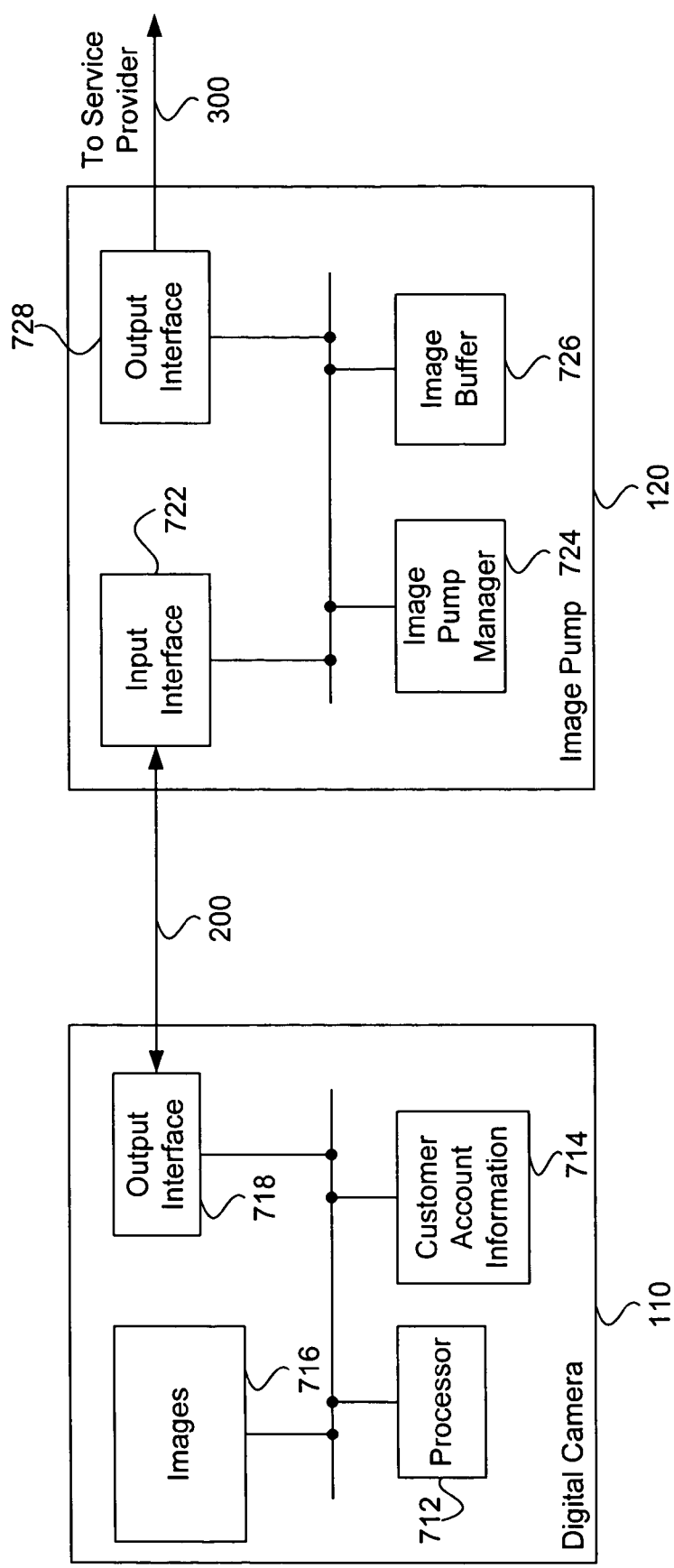
FIG. 7 is a block diagram for one embodiment of the digital camera and the image pump of FIG. 1, according to the present invention.

Referring now to FIG. 7, a block diagram for one embodiment of the digital camera 110 and the image pump 120 of FIG. 1 is shown, according to the present invention. In the FIG. 7 embodiment, digital camera 110 includes, but is not limited to, a processor 712, customer account information 714, images 716, and an input/output (I/O) interface 718. Image pump 120 includes, but is not limited to, an input/output (I/O) interface 722, an image pump manager 724, an image buffer 726, and an output interface 728.

In the FIG. 7 embodiment, image pump 120 is a passive device. Image pump manager 724 is a software module that is retrieved and executed by processor 712 in digital camera 110. In another embodiment, image pump manager 724 may reside in a memory of digital camera 110. Images 716 captured by digital camera 110 are forwarded to image pump 120 according to the instructions of image pump manager 724. Image pump manager 724 may also provide instructions to fetch customer account information 714 and send customer account information 714 to service provider 130 along with images 716. Alternately, customer account information 714 may be stored in image pump 120.

In an alternate embodiment of the present invention, image pump 120 may be implemented inside digital camera 110. In this embodiment, digital camera 110, including image pump 120, would connect directly to service provider 130 via path 300.

Figure 8:
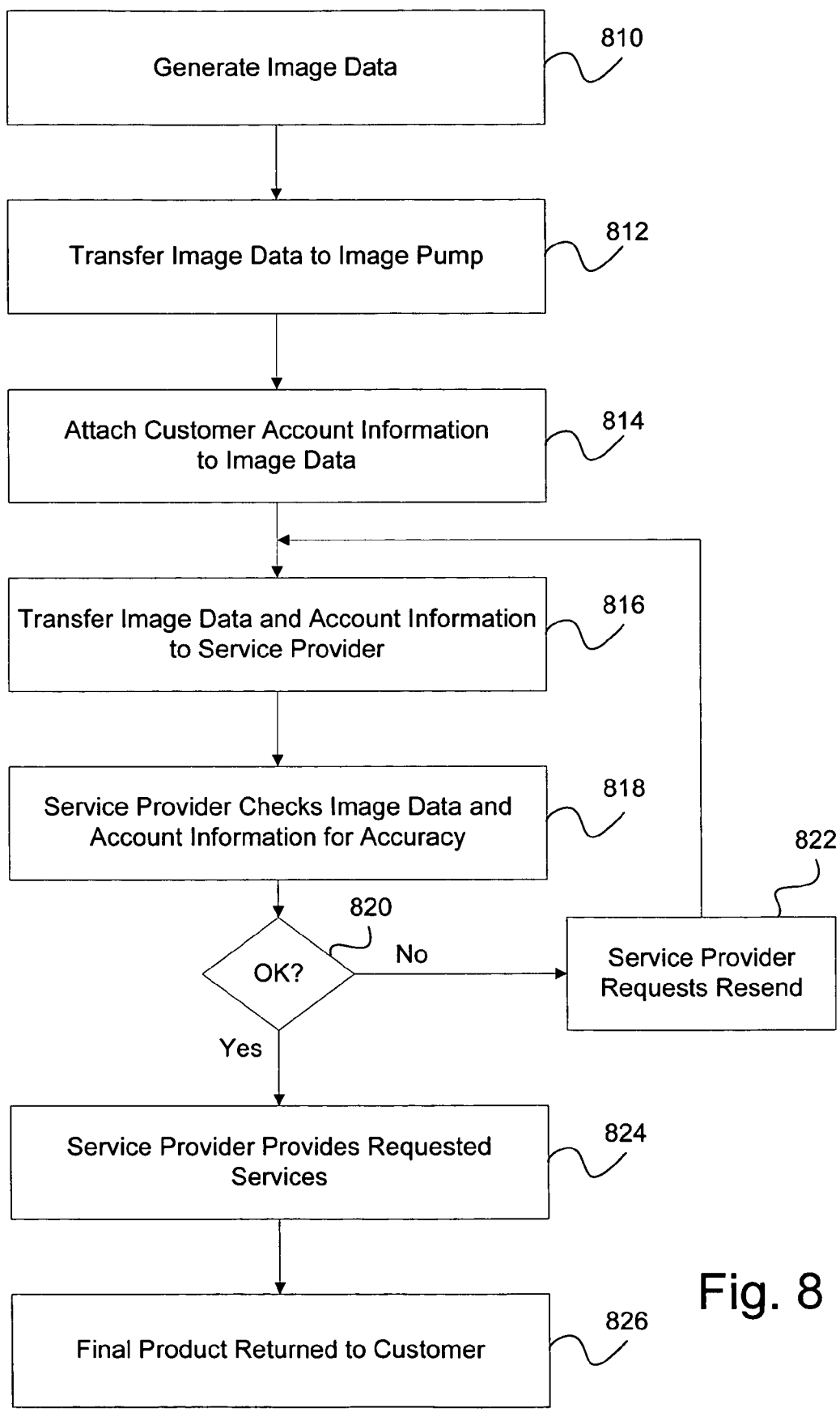
FIG. 8 is a flowchart of method steps for efficiently transferring image data to a service provider, according to one embodiment of the present invention.

Referring now to FIG. 8, a flowchart of method steps for efficiently transferring image data to a service provider is shown, according to one embodiment of the present invention. In the FIG. 8 embodiment, a user has previously established a customer account with service provider 130. One embodiment of method steps for establishing a customer account is discussed below in conjunction with FIG. 9.

Initially, in step 810, digital camera 110 generates digital image data; however, other sources of image data are within the scope of the present invention. Next, in step 812, the digital image data is transferred to image pump 120. The image data may be transferred via any appropriate communication configuration. In step 814, image pump 120 attaches customer account information to the image data. Image pump 120 may also determine any specific processing selections made by the user, and then attach this information to the images.

Then, in step 816, image pump 120 transfers the image data and account information to service provider 130. In step 818, service provider 130 checks the image data and account information for accuracy. Service provider 130, in step 820, then determines whether the data is acceptable (OK). For example, service provider 130 may check the customer account information against its records, and check the format of the image data. The data may not be acceptable if the customer account information has errors, or if the image data is not in an acceptable format. If the data is not acceptable, then, in step 822, service provider 130 requests image pump 120 to correct any errors or inaccuracies and resend the data. The FIG. 8 method then continues with step 816.

In step 820, if the data is acceptable, then, in step 824, service provider 130 preferably provides requested services. These services typically may include producing a print of each digital image, and may also include multiple prints of selected images or enlargements of selected images. Then, in step 826, the final product is returned to the customer, typically via traditional channels such as mail or express delivery services.

Figure 9:
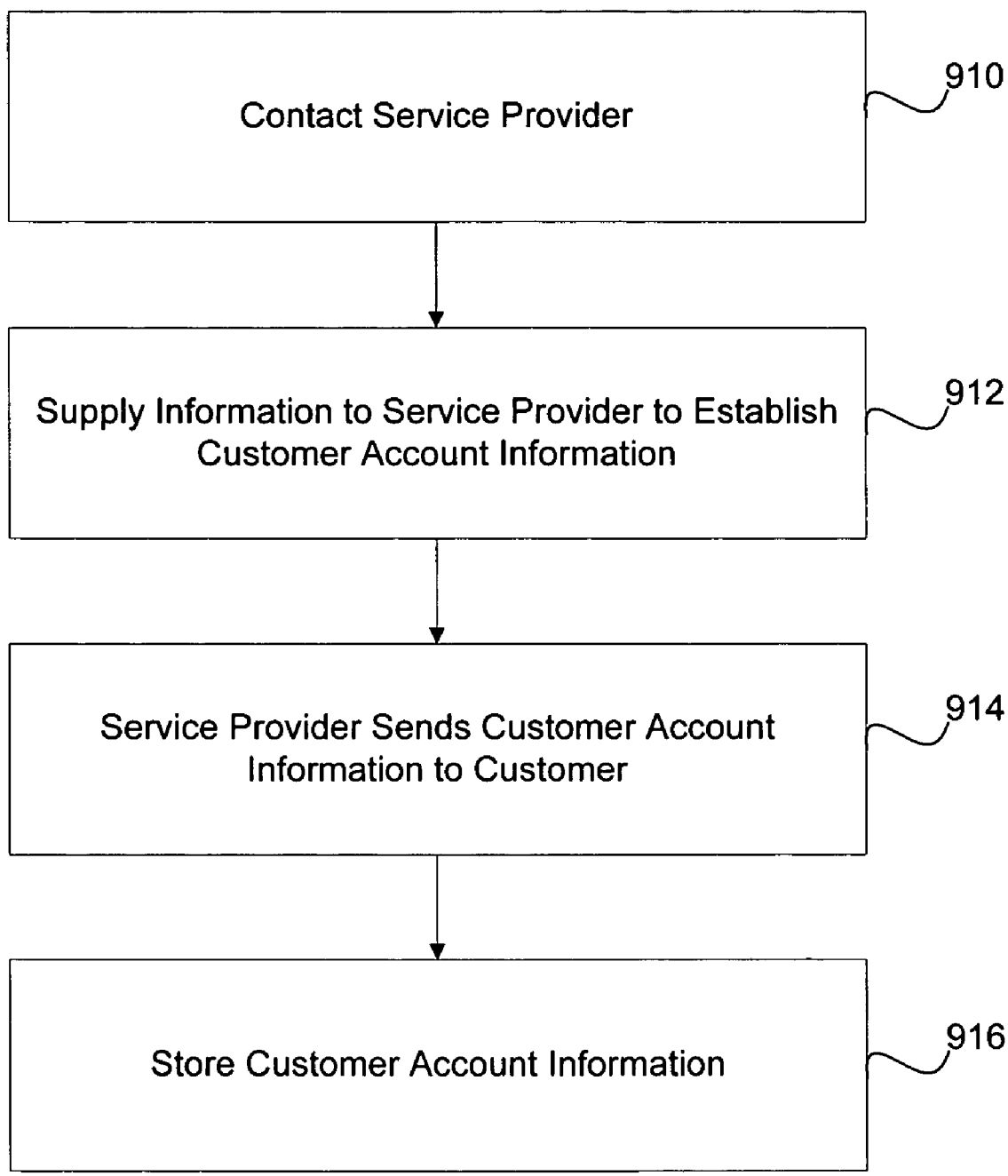
FIG. 9 is a flowchart of method steps for establishing customer account information with a service provider, according to one embodiment of the present invention.

Referring now to FIG. 9, a flowchart of method steps for establishing customer account information with a service provider is shown, according to one embodiment of the present invention. Initially, in step 910, a user or customer contacts service provider 130. This contact may be made via telephone, the Internet, or any other appropriate communication system. In step 912, the customer supplies information to service provider 130 to establish customer account information. The customer account information typically includes the customer's name, address, an account number, and billing information, such as a credit card number.

Then, in step 914, service provider 130 sends the customer account information to the customer. The information may be sent over an Internet connection directly into image pump 120, or may be sent to the customer via mail, email, a telephone call, or any other appropriate form of communication.

Then, in step 916, the customer account information is stored. The customer account information may be stored in image pump 120, digital camera 110, or in a form of removable storage. The customer account information, if sent over an Internet connection to image pump 120, may be saved directly into a memory contained in image pump 120. In another embodiment, the user stores the customer account information into image pump 120, digital camera 110, or removable storage via any appropriate means, such as a keyboard or speech-recognition module. Alternatively, the customer account information from service provider 130 may be sent to the user embodied in a form of removable storage that may be inserted into image pump 120.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for transferring image data to a data destination, comprising:
    a source device configured to provide said image data; and
    an image manager coupled to said source device for transferring said image data from said source device to said data destination, said image manager being implemented in a passive configuration without an internal processor, said image manager including image manager software that is retrieved and executed by a processor of said source device to perform functions of said image manager, said functions including transferring selected images of said image data from said source device to said image manager, and sending customer account information along with said selected images to said data destination, a system user initially contacting said data destination to supply system user information, said data destination responsively generating customer account information and sending said customer account information to said system user, who then locally stores said customer account information in an electronic format for access by said image manager for attaching to said image data prior to uploading said image data to said data destination, said data destination analyzing said image data and said customer account information for accuracy and format errors to determine whether said image data and said customer account information are acceptable after being wirelessly transferred from said source device, said data destination checking said image data for formatting errors and comparing said customer account information with local customer information records for account errors.

2. The system of claim 1 wherein said data destination requests said image manager to retransmit said image data and said customer account information if one of said formatting errors and said account errors are detected.

3. The system of claim 1 wherein said source device is implemented as a digital camera that includes said image manager.

4. The system of claim 1 wherein said image manager controls a wireless transmission procedure for transferring said image data from said source device to said data destination.

5. The system of claim 1 wherein said source device is Internet-enabled for transferring said image data over an Internet network.

6. The system of claim 1 wherein said image manager wirelessly transfers said image data to said data destination over a distributed electronic network for sharing with one or more other device users that are coupled to said distributed electronic network.

7. The system of claim 2 wherein said data destination performs photo finishing functions to produce photographic prints of said image data.

8. The system of claim 1, wherein said image manager is further configured to send audio data from said source device to said data destination.

9. The system of claim 1, wherein said image manager is further configured to send text data from said source device to said data destination.

10. The system of claim 1, wherein said image manager configures said image data to conform to a format required by said data destination.

11. The system of claim 1, wherein said source device includes a touchscreen for displaying said image data to a system user for making user selections with said touchscreen.

12. The system of claim 1, wherein said image manager is configured to determine user selections regarding said image data, said image manager transferring said user selections to said data destination, said user selections including processing preferences and transmission parameters for said image data.

13. The system of claim 1 wherein said source device is implemented as a portable Internet-enabled imaging device, said source device having a data attachment capability for attaching text data and audio data to said image data, said text data and said audio data including user commentary information regarding said image data.

14. The system of claim 1 wherein said source device includes a processor device that executes an image manager program to present individual images from said image data on a local display device for viewing by a system user, said system user using a local input device to select one or more desired images from said individual images for uploading to said data destination, said system user also utilizing said image manager program to attach specific user instructions to said one or more desired images for a subsequent utilization by said data destination.

15. The system of claim 1 wherein said source device includes a processor device that executes an image manager program to attach customer account information to said image data for a subsequent utilization by said data destination, said customer account information including a system user name, a system user address, a system user account number, and system user billing information.

16. The system of claim 1 wherein said data destination requests said image manager to retransmit said image data and said customer account information if one of said formatting errors and said account errors are detected.

17. The system of claim 1 wherein said image manager includes an image manager program that is initially created as an integral part of said image manager to include all network configuration information required for transferring said image data from said source device to said data destination.

18. The system of claim 1 wherein said source device is implemented as a personal digital assistant device or a cellular telephone device.

19. The system of claim 1 wherein image data is transmitted along with identification information that uniquely identifies said source device to said data destination, said data destination being implemented to include a photofinishing system, said image manager being implemented separately from said source device and said data destination, in a non-integral manner, for transferring said image data from said source device to said data destination, a system user instructing said image manager to transfer said image data from said image manager to said data destination by activating image-data transfer means of said image manager.

* * * * *